(12) United States Patent
Cyr et al.

(10) Patent No.: US 10,622,881 B2
(45) Date of Patent: Apr. 14, 2020

(54) CIRCUITS FOR SOFTENING SWITCHING PHASES IN VOLTAGE CONVERTERS

(71) Applicant: TM4 Inc., Boucherville (CA)

(72) Inventors: Jean-Marc Cyr, Candiac (CA); Jianhong Xu, Longueuil (CA); Maalainine El Yacoubi, Montréal (CA); Jean Ricard, La Prairie (CA)

(73) Assignee: TM4 Inc., Boucherville (CA)

( * ) Notice: Subject to any disclaimer, the term of this patent is extended or adjusted under 35 U.S.C. 154(b) by 0 days.

(21) Appl. No.: 15/741,338

(22) PCT Filed: Jun. 29, 2016

(86) PCT No.: PCT/CA2016/050761
§ 371 (c)(1),
(2) Date: Jan. 2, 2018

(87) PCT Pub. No.: WO2017/004700
PCT Pub. Date: Jan. 12, 2017

(65) Prior Publication Data
US 2018/0316256 A1   Nov. 1, 2018

Related U.S. Application Data

(60) Provisional application No. 62/188,910, filed on Jul. 6, 2015.

(51) Int. Cl.
*H02M 1/08* (2006.01)
*H02M 1/088* (2006.01)
(Continued)

(52) U.S. Cl.
CPC ............ *H02M 1/088* (2013.01); *H02M 3/158* (2013.01); *H02M 7/537* (2013.01); *H02M 2001/0058* (2013.01)

(58) Field of Classification Search
CPC ................. H02M 3/158; H02M 7/537; H02M 2001/0058; H02M 1/088; H02M 3/1588
See application file for complete search history.

(56) References Cited

U.S. PATENT DOCUMENTS 5,442,540 A   8/1995  Hua et al.
5,870,294 A   2/1999  Cyr
(Continued)

FOREIGN PATENT DOCUMENTS

WO   2014032156   3/2014
WO   2015070347   5/2015

OTHER PUBLICATIONS

PCT International Search Report of International Searching Authority for International Patent Application No. PCT/CA2016/050761, dated Sep. 13, 2016, 3 pages.
(Continued)

*Primary Examiner* — Fred E Finch, III
*Assistant Examiner* — Rafael O. De León Domenech
(74) *Attorney, Agent, or Firm* — McCoy Russell LLP (57) ABSTRACT

The present disclosure relates to a circuit for providing a current from a source to a load. A commutation cell includes a main switch that controls a voltage applied by the source to the load. An opposite switch maintains the current in the load when the load is disconnected from the source by the main switch. The opposite switch returns the load current to the main switch when the main switch connects again the load to the source. The disclosed circuit configuration reduces recovery current, losses and electromagnetic losses. A synchronizing controller controls opening and closing sequences of the main switch and of the opposite switch. The disclosed circuit can provide a DC-DC voltage converter. Combining two such circuits can provide a DC-AC voltage converter.

14 Claims, 6 Drawing Sheets

(51) Int. Cl.
*H02M 3/158* (2006.01)
*H02M 7/537* (2006.01)
*H01M 1/00* (2006.01)

(56) References Cited

U.S. PATENT DOCUMENTS

| | | | | |
|---|---|---|---|---|
| 5,991,174 | A * | 11/1999 | Farrington | H02M 1/34 323/222 |
| 6,060,867 | A * | 5/2000 | Farrington | H02M 1/34 323/222 |
| 6,236,191 | B1 | 5/2001 | Chaffai | |
| 6,366,064 | B1 * | 4/2002 | Reichard | H02M 7/53873 323/224 |
| 6,434,029 | B1 * | 8/2002 | Cyr | H02M 1/34 323/222 |
| 9,698,689 | B2 * | 7/2017 | Mednik | H02M 3/158 |
| 2003/0095365 | A1 * | 5/2003 | Nakatake | H02H 7/122 361/91.1 |
| 2007/0230228 | A1 * | 10/2007 | Mao | H02M 3/156 363/89 |
| 2012/0057387 | A1 * | 3/2012 | Lai | H02M 7/797 363/132 |
| 2016/0308457 | A1 * | 10/2016 | Yuzurihara | H02M 7/48 |

OTHER PUBLICATIONS

PCT Written Opinion of International Searching Authority for International Patent Application No. PCT/CA2016/050761, dated Sep. 13, 2016, 5 pages.

Yang H T et al: "A novel dual resonant tank for ZVT DC-DC converters with synchronous rectifier", 2011 IEEE Trondheim Powertech, Trondheim, Norway, Jun. 19-23, 2011, IEEE, Piscataway, NJ , Jun. 19, 2011 (Jun. 19, 2011), pp. 1-6, XP032263429, DOI: 10.1109/PTC.2011.6019205 ISBN: 978-1-4244-8419-5.

W. Huang et al: "Zero-voltage-transition converters with a soft-switching auxiliary circuit and reduced current stresses", Telecommunications Energy Conference, 2004. INTELEC 2004. 26th Annual International Chicago, IL, USA Sep. 19-23, 2004, Sep. 19, 2004 (Sep. 19, 2004), pp. 125-132, XP055539147, DOI: 10.1109/INTLEC. 2004.1401455 ISBN: 978-0-7803-8458-3.

European Patent Office, Supplementary European Search Report in Application EP16820591, dated Jan. 31, 2019, 9 pages. European Patent Office, Hauge, Netherlands.

* cited by examiner

CIRCUITS FOR SOFTENING SWITCHING PHASES IN VOLTAGE CONVERTERS

CROSS REFERENCE TO RELATED APPLICATIONS

This application is a national phase under 35 U.S.C. § 371 of International Application No. PCT/CA2016/050761 filed on Jun. 29, 2016, which claims priority to and benefit of U.S. Provisional Ser. No. 62/188,910 filed on Jul. 6, 2015, and the entirety of each of these applications is incorporated by reference herein.

TECHNICAL FIELD

The present disclosure relates to the field of power electronics. More specifically, the present disclosure relates to circuits for softening switching phases in voltage converters.

BACKGROUND

Figure 1:
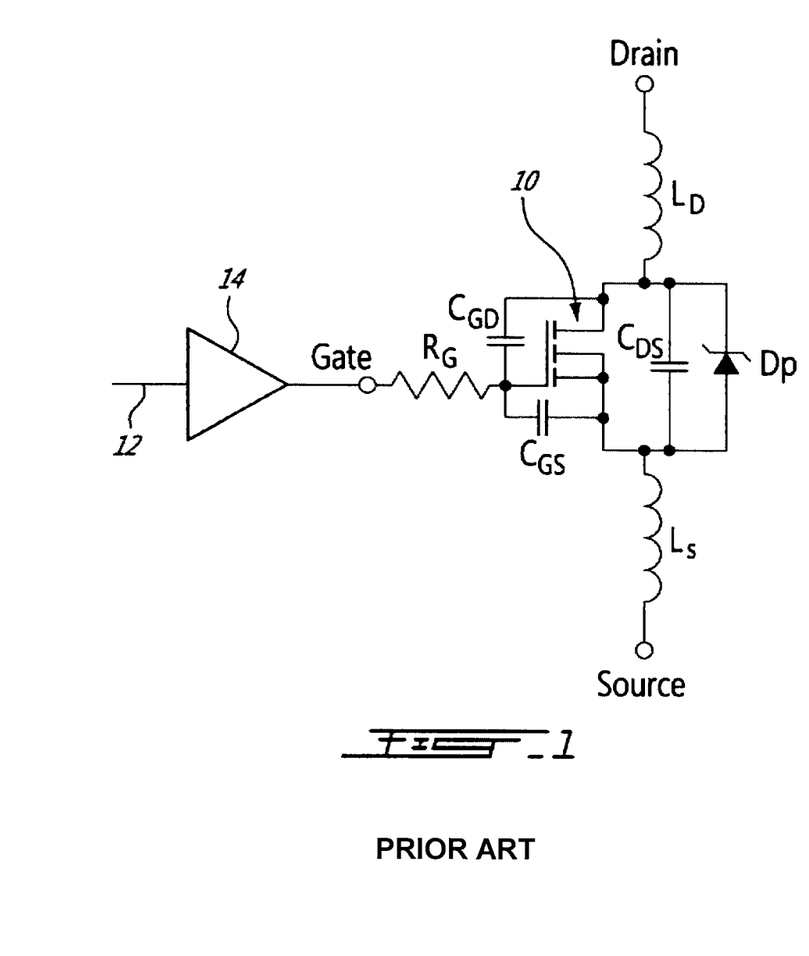
FIG. 1 is a schematic representation of a MOSFET with its parasitic elements and its gate driver.

Commutation cells are commonly used in electronic systems that require conversion of a voltage source, including both DC-DC and DC-AC converters. These commutation cells are based on the use of power electronic switches, for example metal-oxide-semiconductor field-effect transistors (MOSFET). FIG. 1 is a schematic representation of a MOSFET. The shown MOSFET 10 has a Drain, a Gate and a Source and is controlled by signals 12 applied by a gate driver 14 connected to the Gate via a gate resistor $R_G$. As is well-known, the MOSFET 10 includes parasitic (or stray) capacitances such as $C_{GD}$ between the Drain and the Gate, $C_{GS}$ between the Gate and the Source, and $C_{DS}$ between the Drain and the Source. A sum of the capacitances $C_{GD}$, $C_{GS}$ and $C_{DS}$ is often referred to as an output capacitance $C_{OSS}$ of the MOSFET 10. A parasitic diode $D_p$ is present between the Drain and the Source. While current may flow in the MOSFET 10 from the Drain to the Source, current may flow in the diode $D_p$ in the reverse direction. A connection of the MOSFET 10 to a circuit creates parasitic inductances $L_D$ at its drain and $L_S$ at its source. The presence of parasitic components of the MOSFET 10 greatly impacts its behavior upon switching. The MOSFET 10 is well known to those of ordinary skill in the art and is not described further herein.

Figure 2:
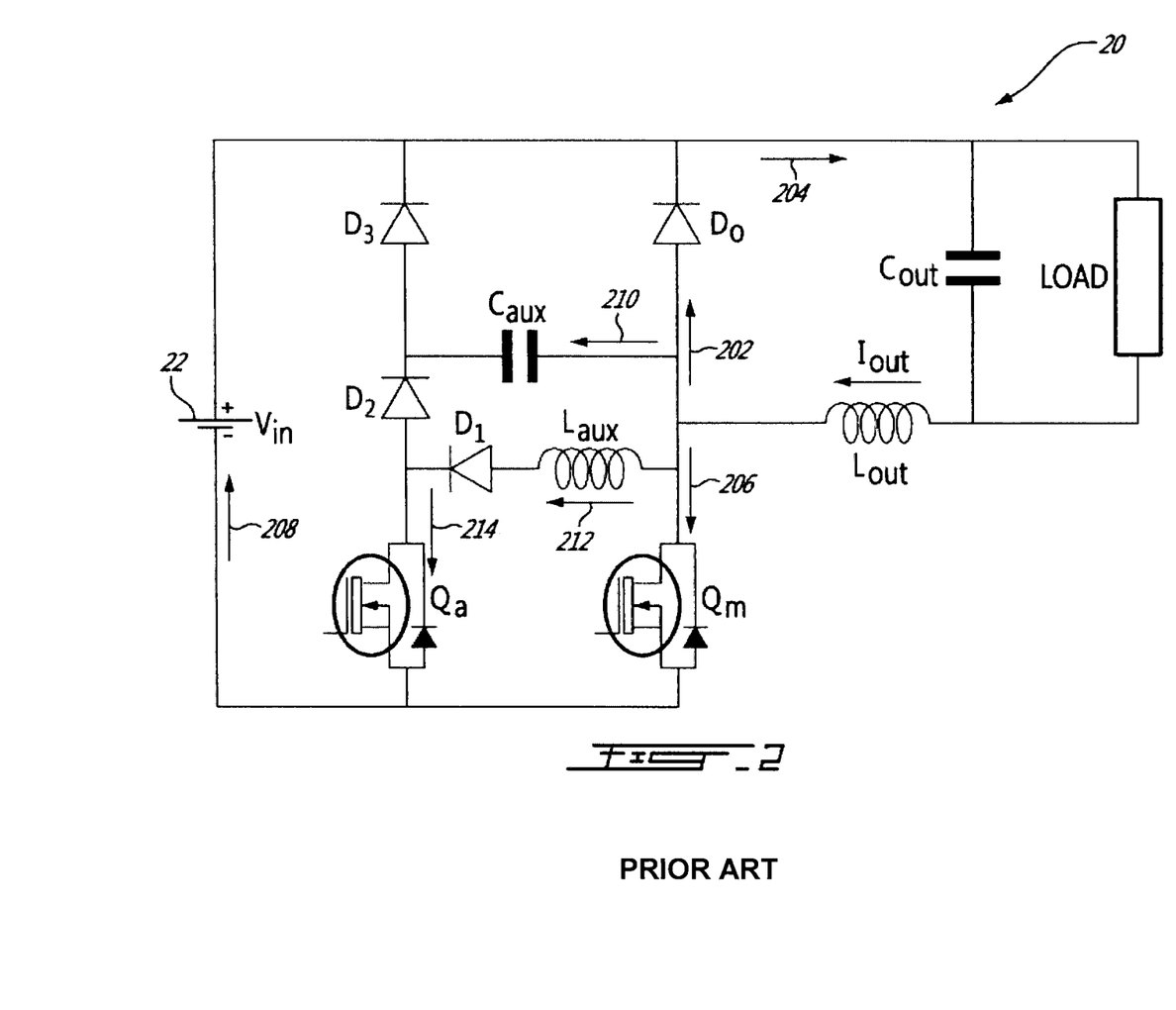
FIG. 2 is a circuit diagram of a conventional MOSFET-based DC-DC Buck converter.

FIG. 2 is a circuit diagram of a conventional MOSFET-based DC-DC converter. In the circuit 20, power from a source 22 having a voltage $V_{in}$ is converted to another DC voltage applied to a load (shown as LOAD on FIG. 2). The LOAD may consist of a purely resistive element or may also include capacitive and/or inductive components. A capacitor $C_{out}$ placed in parallel with the LOAD and an inductor $L_{out}$ placed in series with the LOAD form a filter that averages a voltage across an opposite diode $D_o$, which is described hereinbelow, so that a voltage on the LOAD remains fairly constant.

The circuit 20 includes a commutation cell and a control component (described in details hereinbelow) and controls the voltage applied to the LOAD by the source 22. The commutation cell of the circuit 20 comprises a main switch $Q_m$, which may for example consist of a MOSFET or like power electronic switch, controlled by a gate driver (not shown but shown on FIG. 1), and the opposite diode $D_o$. The commutation cell further includes an equivalent source capacitor (not shown) in parallel with the source 22 and an equivalent current source (not specifically shown) for a current $I_{out}$ that flows in the LOAD.

When the main switch $Q_m$ is open, the current $I_{out}$ flows from the LOAD through the opposite diode $D_o$ and returns to the LOAD, as reflected by the arrows 202 and 204. When the main switch $Q_m$ is closed, the current $I_{out}$ flows through the main switch $Q_m$ and the source 22 and returns to the LOAD, as reflected by the arrows 206, 208 and again 204. When the main switch $Q_m$ is closed, a voltage between its drain and source is zero (or substantially zero) and the entire voltage $V_{in}$, for example 450 Volts DC, is applied across the opposite diode $D_o$. It is however intended to use the circuit of FIG. 2 to apply a controlled DC voltage to the LOAD, this controlled DC voltage being lower than the voltage $V_{in}$ of the source 22. To this end, the commutation cell is switched on and off at a rapid rate, a duty cycle of the commutation cell controlling an effective voltage applied to the LOAD. The voltage applied on the LOAD is equal to the duty cycle multiplied by the voltage $V_{in}$ of the source 22.

The auxiliary components of the circuit 20 comprise an auxiliary capacitor $C_{aux}$, an auxiliary inductor $L_{aux}$, diodes $D_1$, $D_2$ and $D_3$, as well as an auxiliary switch $Q_a$. Initially, when the main switch $Q_m$ is conducting the entire current $I_{out}$ (see arrow 206) the voltage between its drain and source is zero. At that time, a voltage on the auxiliary capacitor $C_{aux}$ is substantially equal to $V_{in}$. Opening the main switch $Q_m$, the current $I_{out}$ is gradually deviated in the auxiliary capacitor $C_{aux}$, arrow 210. Accordingly, the voltage slope is limited and therefore allows $Q_m$ to turn-off at almost zero voltage, thereby reducing switching losses in the main switch $Q_m$.

Then, while the main switch $Q_m$ is off, the auxiliary switch $Q_a$, for example another MOSFET, is closed in preparation for closing the main switch $Q_m$ again. The voltage that was applied across the auxiliary switch $Q_a$ is gradually deviated across the auxiliary inductor $L_{aux}$. Accordingly, the current slope is limited and therefore allows $Q_a$ to turn-on at almost zero current, thereby reducing switching losses in the auxiliary switch $Q_a$.

A portion of the current $I_{out}$ is now directed via the auxiliary inductor $L_{aux}$ to this auxiliary switch $Q_a$, see arrows 212 and 214. The auxiliary inductor $L_{aux}$ limits the voltage across the auxiliary switch $Q_a$ in order to minimize switching losses. As a voltage across the auxiliary switch $Q_a$ decreases, while it becomes closed, its current variation di/dt increases, causing a voltage across the auxiliary inductor $L_{aux}$ to also increase. At the time when the auxiliary switch $Q_a$ becomes fully conductive (i.e. when it is fully closed), the voltage $V_{in}$ is substantially present on the auxiliary inductor $L_{aux}$ and the current variation di/dt becomes equal to $V_{in}$ divided by the value of the auxiliary inductor $L_{aux}$. Until this moment, at least a part of the current $I_{out}$ was flowing through the opposite diode $D_o$, along arrow 202, on which a voltage is initially at or near zero. When the entire current $I_{out}$ flows through the auxiliary switch $Q_a$, arrow 214, a recovery current starts flowing in reverse direction in the opposite diode $D_o$, in a direction opposite to that of arrow 202. This recovery current in the opposite diode $D_o$ has a rate of $V_{in}$ divided by $L_{aux}$. Rapidly, once charges accumulated on the PN junction of the opposite diode $D_o$ are withdrawn, the opposite diode $D_o$ becomes blocked and a resonance is initiated between the auxiliary inductor $L_{aux}$ and parasitic capacitances (not shown) of the opposite diode $D_o$, of the main switch $Q_m$ and of another diode $D_2$ through the auxiliary capacitor $C_{aux}$. It is observed that the auxiliary capacitor $C_{aux}$ is much larger than the parasitic capacitance of the diode $D_2$. Energy accumulated in these capacitors is transferred to the auxiliary inductor $L_{aux}$ after a quarter of a resonant cycle.

Because the opposite diode $D_o$ is now blocked and because a resonance with the above mentioned capacitors has taken place for quarter of a cycle, a voltage thereacross is equal to $V_{in}$. A voltage on the main switch $Q_m$ is therefore zero, allowing closing of this main switch $Q_m$ at zero voltage. The auxiliary switch $Q_a$ is then opened in order to limit losses in the auxiliary inductor $L_{aux}$. The current that was flowing in the auxiliary switch $Q_a$ is gradually deviated to the auxiliary capacitor $C_{aux}$. Accordingly, the voltage slope is limited and therefore allows $Q_a$ to turn-off at almost zero voltage, thereby reducing switching losses in the auxiliary switch $Q_a$, thereby reducing switching losses in the auxiliary switch $Q_a$. As expressed hereinabove, charges accumulated on the auxiliary capacitor $C_{aux}$ will be transferred to the main switch $Q_m$ when this latter switch opens, in another cycle. No significant energy is spent in the auxiliary capacitor $C_{aux}$. This current in the auxiliary inductance reaches zero after a time dictated by the current that flows therein upon opening of switch $Q_a$ and a current variation in the auxiliary inductance di/dt that defined as the source voltage $V_{in}$ divided by the auxiliary inductor $L_{aux}$.

Upon opening of the auxiliary switch $Q_a$, due to the current variation di/dt in the diode $D_1$ at a rate of $V_{in}$ divided by $L_{aux}$, there will be a recovery current in the diode $D_1$, which is in series with the auxiliary inductor $L_{aux}$. Another recovery current will also be present in the diode $D_3$, but it will be very small because the auxiliary capacitor $C_{aux}$ is large. The voltage across the diode $D_3$ remains near zero. Yet another recovery current in the diode $D_2$ will be very small because an output capacitance $C_{OSS}$ of the auxiliary switch $Q_a$ is large compared to the parasitic capacitance of the diode $D_1$ and further because the diode $D_2$ is smaller than the diode $D_1$. These recovery currents are however of secondary importance because the diodes $D_2$ and $D_3$ are much smaller than the opposite diode $D_o$. The diode $D_1$ provides a soft recovery because it is larger than the diodes $D_2$ and $D_3$ and because, as mentioned hereinabove it turns off with the current variation di/dt at a rate of $V_{in}$ divided by $L_{aux}$.

Those familiar with the circuit 20 will appreciate that it can be operated at a duty cycle in a range from zero to 100 percent, wherein the duty cycle is defined as a ratio of the closing time of the switches over a complete cycle time of the commutation cell. It is however required to allow full closing of the switches when the duty cycle is greater than zero. It is also required to prevent opening of the switches if the duty cycle is so great that the auxiliary capacitor $C_{aux}$ is prevented from fully discharging upon opening of the main switch $Q_m$.

The circuit 20 of FIG. 2 suffers from the following drawbacks.

Firstly, the recovery current in the opposite diode $D_o$, which is a large diode and, in case of a full leg, the very slow parasitic diode of a MOSFET, generates significant losses occurring in the circuit 20, primarily in the diode itself and in the auxiliary inductor $L_{aux}$ as well as in the auxiliary switch $Q_a$ due to the recovery current before added to the load current. These losses impact the efficiency of the circuit 20 and limit the switching frequency. The losses generate heat that must in most cases be dissipated, cumulated with the limited switching frequency, which in turn impact the physical size of a converter built on the basis of the circuit 20.

Secondly, the resonance between various elements of the circuit 20, in particular at the time of blocking the opposite diode $D_o$, when the recovery current causes a very high dV/dt across the parasitic capacitance of the opposite diode $D_o$, causes significant noise in terms of electromagnetic interference (EMI). This EMI may be detrimental to many applications and may require complex filtering, which in turn may involve an increase of the size and/or cost of the physical implementation of the circuit 20, or a decrease of its performance, or both.

Finally, the energy flow may only circulates from the high voltage to the low voltage (unidirectional from input to output) so it can only be used has a DC/DC buck converter.

Therefore, there is a need for improvements to converter circuits that compensate for problems related to poor efficiency and electromagnetic noise generation in power electronics circuits and to improve the flexibility to allows the operation as DC/DC boost converter, as DC/AC converter or as AC/DC converter.

SUMMARY

According to the present disclosure, there is provided a circuit for providing a current from a source to a load. A commutation cell includes a main switch that controls a voltage applied by the source to the load. An opposite switch maintains the current in the load when the load is disconnected from the source by the main switch. The opposite switch returns the load current to the main switch when the main switch connects again the load to the source. A synchronizing controller controls opening and closing sequences of the main switch and of the opposite switch.

According to the present disclosure, there is also provided a DC-DC converter implemented using the circuit for providing a current from a source to a load.

The present disclosure further relates to a DC to AC converter implemented using the circuit for providing a current from a source to a load and a peer commutation cell. The opposite switch is used as a peer main switch of the peer commutation cell while the main switch is used as a peer opposite switch of the peer commutation cell. The synchronizing controller controls opening and closing sequences of the main switch, of the peer main switch, of the opposite switch and of the peer opposite switch so that the current flowing in the load is an alternative current.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems related to the generally poor efficiency and to the electromagnetic noise generation in power electronics circuits.

In a switching circuit that includes a commutation cell, these problems are alleviated by replacing an opposite diode, conventionally used to maintain a freewheeling current in a load when a main switch of the commutation cell is opened (non-conductive), by an opposite switch. The large size of the opposite diode causes a large amount of recovery current when the main switch starts conducting again, in turn causing important switching losses and electromagnetic noise. In contrast, the present disclosure proposes to replace the opposite diode by a switch (Qo) that can be controlled in synchrony with the main switch to carry the freewheeling load current until the load current is completely deviated from the opposite switch to the auxiliary switch. The opposite switch is fully opened with a minimum of the remaining charges to be recovered, and to gradually, in a resonant manner, reduce the voltage across the main switch to turn it on at zero voltage; the main switch is conducting the full load current again. This synchronization of the main switch and of the opposite switch softens the overall behavior of the circuit upon switching, reducing switching losses of the opposite diode, in turn reducing switching losses and electromagnetic losses.

The disclosed circuit can be used as a DC-DC voltage converter. A DC-AC converter, also called inverter, can be obtained by combining two commutation cells of opposite polarities as will be described herein.

The following terminology is used throughout the present disclosure:

Softening: reduction of transient effects, dI/dt and dV/dt, upon switching in a circuit.

Commutation cell: an assembly of electronic components connected to a voltage source that alternatively supplies current to a current source and allow freewheel of this a current source connected to a load.

Switch: a power electronic switch that is forced opened and forced closed.

Main switch: switch of the commutation cell that passes current from the voltage source to the current source when is conductive or from the current source to the voltage source.

Auxiliary switch: switch in parallel with the main switch and in series with an auxiliary inductance, the auxiliary switch being arranged to turn-on at almost zero current before the main switch.

Opposite switch: a switch that is in parallel with the diode of the commutation cell and that takes the load current when the main switch is not conductive.

Controller: a processor, computer, FPGA, CPLD, DSP, CPU, or a combination of any number of these components, possibly including a memory, an interface, an analog to digital converter, and similar components, the controller may be hard-wired for carrying a function or may comprise programmable code for carrying a function.

Synchronizing controller: a controller that gives commands to the switches, via respective gate drivers, to control opening and closing sequences of the switches in a synchronized manner.

Auxiliary capacitor, auxiliary inductor and auxiliary diodes: components of the commutation cell, distinct from components of the load, used to deviate current and/or voltage during commutations.

Zero voltage: In the present disclosure, a 'zero voltage' on a component such as a diode or a switch indicates that this component is conductive. In practice, the voltage on this component may be slightly greater than zero volts while still being significantly less than a voltage of the power source or than a load voltage. Expressions 'zero voltage' and equivalent are used in order to simplify the present disclosure and are not to be construed in the absolute.

Zero current: In the present disclosure, a 'zero current' on a component such as a diode or a switch indicates that this component is not conductive. In practice, there is always a small current often called leakage current. Expressions 'zero current' and equivalent are used in order to simplify the present disclosure and are not to be construed in the absolute.

Figure 3:
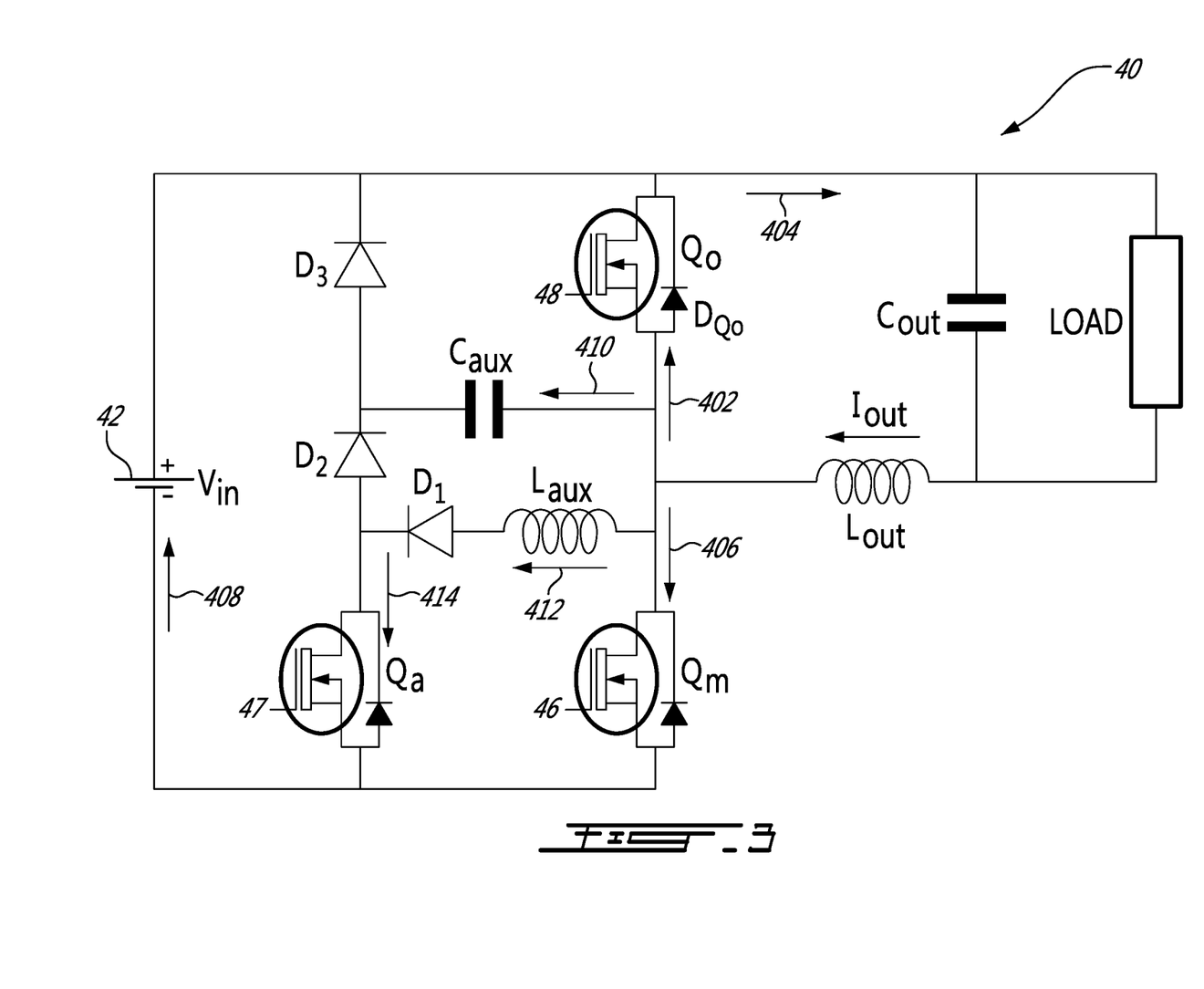
FIG. 3 is a circuit diagram of a soft switching synchronized DC-DC buck converter according to an embodiment.

Referring now to the drawings, FIG. 3 is a circuit diagram of a soft switching synchronized DC-DC converter according to an illustrative embodiment. In the circuit 40, power from a source 42 having a voltage $V_{in}$ is converted to another DC voltage applied to a load (shown as LOAD on FIG. 3). The LOAD may consist of a purely resistive element or may also include capacitive and/or inductive components. A capacitor $C_{out}$ placed in parallel with the LOAD and an inductor $L_{out}$ placed in series with the LOAD form a filter that averages a voltage as will be described hereinbelow.

The circuit 40 differs from the circuit 20 of FIG. 2 mainly in that the opposite diode $D_o$ of the circuit 20 is replaced by another controlled power electronic switch, opposite switch $Q_o$, which has its own parasitic diode $D_{Qo}$ This modification to the conventional circuit 20 of FIG. 2 brings important changes to its behavior. The main switch $Q_m$, the auxiliary switch $Q_a$ and the opposite switch $Q_o$ have respective gates 46, 47 and 48 connected to respective gate drivers (shown on FIG. 5) to control their opening and closing.

The circuit 40 includes a commutation cell and a control component (described in details hereinbelow) and controls the voltage applied to the LOAD by the source 42. The commutation cell of the circuit 40 includes a main switch $Q_m$, which may for example consist of a MOSFET or like power electronic switch, controlled by a gate driver (not shown but shown on FIG. 1). The opposite diode $D_o$ of FIG. 2 is replaced with the opposite switch $Q_o$ in the commutation cell of the circuit 40. The commutation cell further includes an equivalent source capacitor (not shown) in parallel with the source 42 and the inductor $L_{out}$, which represents an equivalent load inductance for a current $I_{out}$ that flows in the LOAD.

When the main switch $Q_m$ is open, the current $I_{out}$ flows from the LOAD through the opposite switch $Q_o$ controlled by a gate driver and returns to the LOAD, as reflected by the arrows 402 and 404. When the main switch $Q_m$ is closed, the current $I_{out}$ flows through the main switch $Q_m$ and the source 42 and returns to the LOAD, as reflected by the arrows 406, 408 and again 404. When the main switch $Q_m$ is closed, a voltage between its drain and source is zero and the entire voltage $V_{in}$, for example 450 Volts DC, is applied across the opposite switch $Q_o$. It is however intended to use the circuit of FIG. 3 to apply a controlled DC voltage to the LOAD, this controlled DC voltage being lower than the voltage $V_{in}$ of the source 42 by a factor equal to a duty cycle of the circuit 40. To this end, the commutation cell is switched on and off at a rapid rate in order to control an effective voltage applied to the LOAD. The commutation cell may be cycled at a rapid rate, for example at 300 KHz.

The auxiliary components of the circuit 40 comprises an auxiliary capacitor $C_{aux}$, an auxiliary inductor $L_{aux}$, auxiliary diodes $D_1$, $D_2$ and $D_3$, as well as an auxiliary switch $Q_a$, which may be another MOSFET or like power electronic switch. Initially, when the main switch $Q_m$ is conducting the entire current $I_{out}$, see arrow 406, the voltage between its drain and source is zero. Opening the main switch $Q_m$, the current $I_{out}$ is gradually deviated in the auxiliary capacitor $C_{aux}$, arrow 410, which discharges from the voltage $V_{in}$ to zero. As mentioned hereinabove, the voltage slope is limited and therefore allows Qm to turn-off at almost zero voltage, thereby reducing switching losses in the main switch $Q_m$.

The parasitic diode $D_{Qo}$ of the opposite switch $Q_o$ starts to take the load current. The opposite switch $Q_o$ then starts to close at zero voltage in order to reduce conduction losses in its parasitic diode $D_{Qo}$, eliminate the switching losses and to limit charges accumulated on its PN junction in view of its later opening. At the same time, the inductor $L_{out}$ causes the current $I_{out}$ to remain substantially constant during the opening of the main switch $Q_m$. Following opening of the main switch $Q_m$, the current $I_{out}$ is now flowing in the opposite switch $Q_o$, along arrow 402, before returning to the LOAD, arrow 404. The voltage drop across Qo does allow a small current to circulate in Do.

Then, while the main switch $Q_m$ is off, the auxiliary switch $Q_a$ is closed in preparation for closing the main switch $Q_m$ again. A portion of the current $I_{out}$ is now directed via the auxiliary inductor $L_{aux}$ to this auxiliary switch $Q_a$, see arrows 412 and 414. The auxiliary inductor $L_{aux}$ limits the flow of current through the auxiliary switch $Q_a$ during the transition of its drain to source voltage from $V_{in}$ to zero in order to minimize switching losses. As a voltage across the auxiliary switch $Q_a$ decreases, while it turns on, its current variation di/dt increases, causing a voltage across the auxiliary inductor $L_{aux}$ to also increase. At the time when the auxiliary switch $Q_a$ becomes fully conductive (i.e. when it is fully closed), the full voltage $V_{in}$ is present on the auxiliary inductor $L_a$ and the current variation di/dt becomes equal to $V_{in}$, divided by the value of the auxiliary inductor $L_{au}$. Until this moment, at least a part of the current $I_{out}$ was flowing through the opposite switch $Q_o$, along arrow 402, on which a voltage is initially at or near zero. Once the entire current $I_{out}$ flows in the auxiliary switch $Q_a$, arrow 414, the current in the opposite switch $Q_o$ begins to flow in a reverse direction, which is opposite to the direction of the arrow 402. Because a drain to source resistance of the opposite switch $Q_o$ is very low when closed, very little current was flowing in its parasitic diode $D_{Qo}$ while it was closed and, consequently, very few charges were accumulated on its PN junction. Current that is now flowing in the reverse direction in the opposite switch $Q_o$, opposite to the direction of the arrow 402, removes the remaining charges and completely blocks its parasitic diode $D_{Qo}$. Opening the opposite switch $Q_o$ under a low current condition, for example at 15% of the rated current for the LOAD, limits the switching losses of the opposite switch $Q_o$ and significantly reduces the switching losses of its parasitic diode $D_{Qo}$, also reducing associated electromagnetic noise. This is achieved by using a precise triggering time for the opposite switch $Q_o$, for example with a resolution of about 10 nsec. In this manner, significant current and losses, important noise and long switching times in the auxiliary switch $Q_a$ due to its own slow parasitic diode can be alleviated. It may be observed that reverse current in the opposite switch $Q_o$ is lower than an equivalent recovery current of a diode that is conventionally used.

Some resonance is initiated between the auxiliary inductor $L_{aux}$ and parasitic capacitances (not shown) of the opposite switch $Q_o$, of the main switch $Q_m$ and of another diode $D_2$ through the auxiliary capacitor $C_{aux}$. It is observed that the auxiliary capacitor $C_{aux}$ is much larger than the parasitic capacitance of the diode $D_2$. Energy accumulated in these capacitors is transferred to the auxiliary inductor $L_{aux}$ after a quarter of a resonant cycle. The voltage across $C_{aux}$ should remain near zero to limit the voltage across $Q_a$ upon turn-off.

Because the opposite switch $Q_o$ is now opened, a voltage thereacross is equal to $V_{in}$. A voltage on the main switch $Q_m$ is therefore zero, allowing closing of this main switch $Q_m$ at zero voltage without any significant turn-on losses. The auxiliary switch $Q_a$ is then opened in order to limit losses in the auxiliary inductor $L_{aux}$. Opening the auxiliary switch $Q_a$, the current in $Q_a$ is gradually deviated in the auxiliary capacitor $C_{aux}$, reverse of arrow 210. Accordingly, the voltage slope is limited and therefore allows $Q_a$ to turn-off at almost zero voltage, thereby reducing switching losses in the auxiliary switch $Q_a$. As expressed hereinabove, charges accumulated on the auxiliary capacitor $C_{aux}$ will be transferred to the main switch $Q_m$ when this latter switch opens, in another cycle of the circuit 40. No significant energy is dissipated in the auxiliary capacitor $C_{aux}$. The current in the auxiliary switch $Q_a$ is deviated in the diodes $D_2$ and $D_3$. The current in the auxiliary inductor $L_{aux}$ reaches zero after a time dictated by current variation di/dt of $V_{in}$, divided $L_{aux}$.

Due to current variation di/dt in the auxiliary inductor $L_{aux}$, there will be a recovery current in a diode $D_1$, which is in series with the auxiliary inductor $L_{aux}$. Another recovery current will also be present in a diode $D_3$, but it will be very small because the auxiliary capacitor $C_{aux}$ is large. Yet another recovery current in the diode $D_2$ will be very small because an output capacitance $C_{OSS}$ of the auxiliary switch $Q_a$ is large and further because the diode $D_2$ is smaller than the diode $D_1$. These recovery currents are however of secondary importance because the diodes $D_2$ and $D_3$ are much smaller than the parasitic diode $D_{Qo}$ of the opposite switch $Q_o$. The diode $D_1$ provides a soft recovery because it is larger than the diodes $D_2$ and $D_3$ and because, as mentioned hereinabove it turns off with the current variation di/dt at a rate of $V_{in}$ divided by $L_{aux}$.

The main switch $Q_m$, the auxiliary switch $Q_a$ and the opposite switch $Q_o$ may each comprise a MOSFET, a junction field effect transistor (JFET) including a silicon carbide (SiC) or a gallium nitride (GaN) JFET, or another type of power electronic switch. The various switches of the circuit 40 may be of different types. Each switch may also include an insulated-gate bipolar transistor (IGBT) used in parallel with an associated diode, as conventional IGBTs do not comprise any significant intrinsic diodes.

Figure 4:
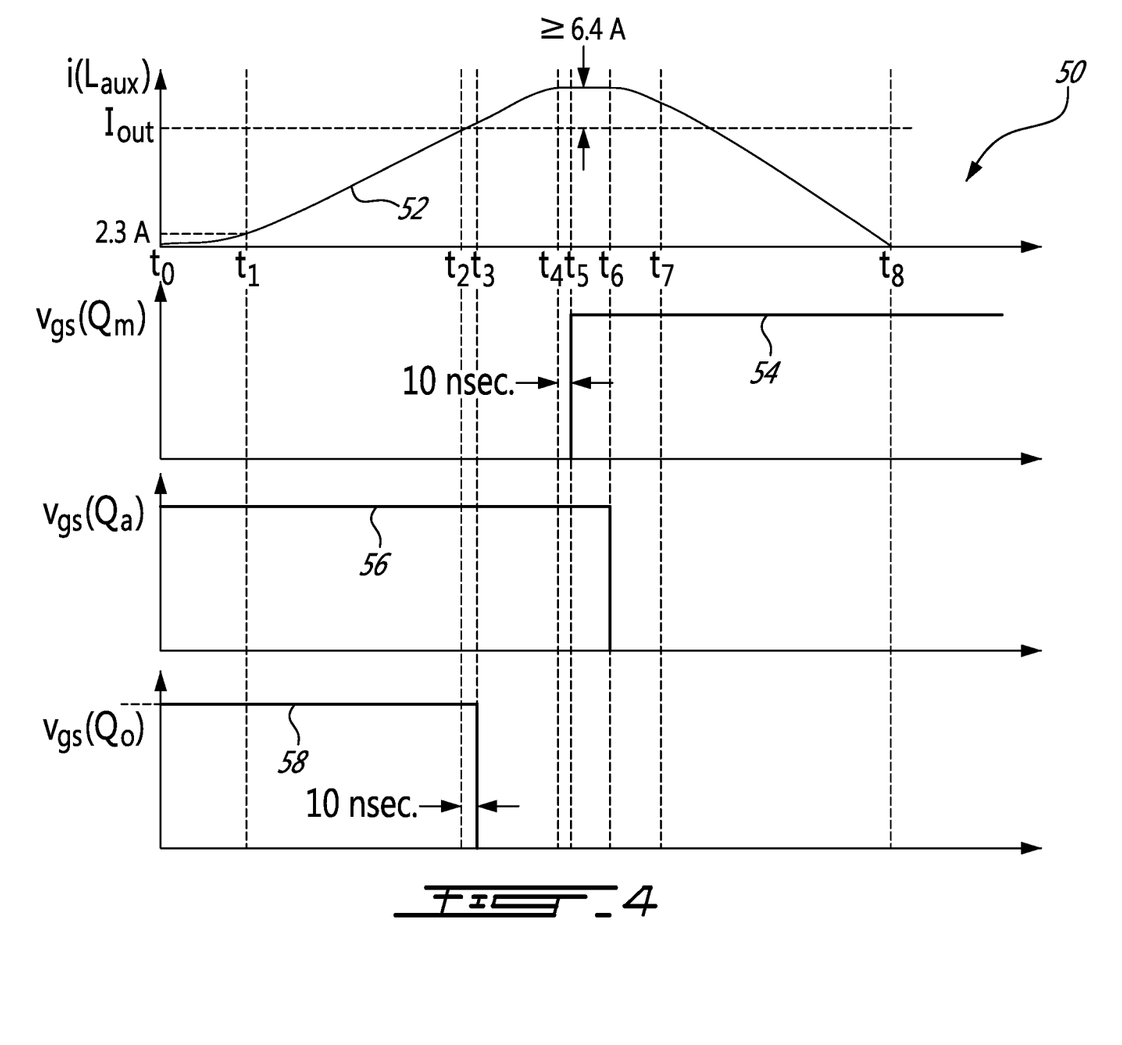
FIG. 4 is a timing diagram showing operations leading to turning on the main switch of the circuit of FIG. 3 and an impact of those operations on a current in the auxiliary inductor.

FIG. 4 is a timing diagram showing operations leading to turning on the main switch of the circuit of FIG. 3 and an impact of those operations on a current in the auxiliary inductor. A timing diagram 50 shows a varying current 52 in the auxiliary inductor $L_{aux}$ as a function opening and closing sequences of the main switch $Q_m$ (sequence 54), of the auxiliary switch $Q_a$ (sequence 56) and of the opposite switch $Q_o$ (sequence 58). These latter sequences 54, 56 and 58 are expressed in terms of gate to source voltages ($V_{gs}$) applied to each of the switches. It will be understood that the switches are conductive when the lines of the sequences 54, 56 and 58 represent high $V_{gs}$ voltages (lines are high) and not conductive when the $V_{gs}$ voltages are low (lines are low). For example, the opposite switch $Q_o$ is initially conductive until a time $t_3$, as illustrated by the sequence 58. A gate driver circuit (shown on FIG. 5) controls the closing time of the switches $Q_a$, $Q_o$ and $Q_m$.

Initially, before time $t_0$, the opposite switch $Q_o$ is the sole conducting switch, as reflected by the dotted line extending the sequence 58 on the left of the timing diagram 50, before the time $t_0$, and the current $I_{out}$ is freewheeling between the LOAD and the opposite switch $Q_o$, flowing from the source to the drain in the opposite switch $Q_o$, see arrows 402 and 404 on FIG. 3. The auxiliary switch $Q_a$ is closed at time $t_0$ and its voltage starts to decrease. A value of the time $t_0$ when the auxiliary switch $Q_a$ is closed is used to calculate the current 52 in the auxiliary inductor $L_{aux}$. Then, considering a constant and gradual decrease of a drain to source voltage across the auxiliary switch $Q_a$, the voltage across the auxiliary inductor $L_{aux}$ increases gradually to reach the voltage $V_{in}$, of the source 42 at the time $t_1$, at which time the drain to source voltage of the auxiliary switch $Q_a$ falls to zero. The current 52 at the time $t_1$ ($I_{t1}$) can be calculated using equation (1):

$$I_{t1} = \int_0^{t1} \left( \frac{1}{Laux} \cdot \frac{Vin}{t1} \cdot t \right) dt = \frac{Vin * t1}{2 * Laux} \quad (1)$$

The time duration from $t_0$ to $t_1$ may be approximated as a constant because it is substantially independent of the load current, only depending on the voltage $V_{in}$. In practice, it has been found that a 20% difference of the voltage $V_{in}$ has little effect on the current 52 and on the time $t_1$.

The current 52 in the auxiliary inductor $L_{aux}$ continues to increase with a slope of $V_{in}$ divided by $L_{aux}$ and reaches a value of the current $I_{out}$ in the LOAD at a time $t_2$. The calculation of the time duration between $t_2$ and $t_1$ can be calculated using equation (2):

$$t2 - t1 = Laux * \frac{Iout - I_{t1}}{Vin} \quad (2)$$

The opposite switch $Q_o$ is maintained conductive for a brief period in a range of about 5 to 15 nsec, for example for 10 nsec after $t_2$, until a reversal of the current in the opposite switch $Q_o$, now flowing from the drain to the source at a time $t_3$. The above mentioned resonance between the auxiliary inductor $L_{aux}$ and the various parasitic capacitances of the circuit 40 is initiated at the time $t_3$, after opening of the opposite switch $Q_o$, and lasts for up to a quarter of a cycle until a time $t_4$. The added current will have a slope of $V_{in}$ divided by $L_{aux}$ and a duration $t_4$-$t_3$ of up to about 55 nsec. This current and a very low recovery current of the parasitic diode $D_{Qo}$ add to the current 52 in auxiliary inductor $L_{aux}$ such that the current 52 overshoots above the value of the current $I_{out}$. A proper timing for opening the opposite switch $Q_o$ is effective in reducing electromagnetic noise and switching losses in the parasitic diode $D_{Qo}$, as long as the additional current, for example 450 volts over an inductance of 5 µH, or 0.9 amperes, remains below the maximum reverse recovery current of a standard diode.

The main switch $Q_m$ can be closed shortly after the overshoot, at time $t_5$, for example 10 nsec after the time $t_4$. Soon thereafter, for example after another delay of about 50 nsec until a time $t_6$, the auxiliary switch $Q_a$ is opened and its current is being deviated in the auxiliary capacitor $C_{aux}$ that is charged up to $V_{in}$. The drain to source voltage of the auxiliary switch $Q_a$ increases and, consequently, so does the voltage across the auxiliary inductance $L_{aux}$ and across the auxiliary capacitor $C_{aux}$. The current 52 in the auxiliary inductance $L_{aux}$ starts to decrease with a slope dictated by its voltage. Once the voltage across the auxiliary switch $Q_a$ reaches $V_{in}$, at a time $t_7$, the slope of the current in the auxiliary inductor $L_{aux}$ becomes $-V_{in}$ divided by $L_{aux}$. The current in the auxiliary inductor $L_{aux}$ reaches zero at a time $t_8$.

In the example of FIG. 4, the current 52 reaches 2.3 A at a time $t_1$ of 50 nsec (i.e. 50 nsec after $t_0$) and has an overshoot of at least 6.4 A between $t_3$ and $t_4$. The magnitude of the current 52 at time $t_1$, which is 2.3 A, is essentially a function of this 50 nsec time duration and of a value the auxiliary inductor $L_{aux}$, which is set to 5 µH (microHenries) in the example of FIG. 4. The voltage $V_{in}$ and the current $I_{out}$ have little impact of the amount of current 52 at time $t_1$. These and other numerical values expressed in the description of the example of FIG. 4 are for illustration only and do not limit the present disclosure.

A span between times $t_3$ and $t_4$ up to about 55 nsec in the example of FIG. 4. This value corresponds to a quarter of 4.5 MHz natural resonant frequency between the auxiliary inductor $L_{aux}$ and the parasitic capacities of the switches $Q_m$ and $Q_o$.

A span between times $t_7$ and $t_8$ can be estimated as a peak value of the current 52 times the value of the auxiliary inductor $L_{aux}$ divided by $V_{in}$. The time $t_8$ defines a minimum pulse width for the circuit 40. The main switch $Q_m$ should not be opened before that time. Starting from the time $t_8$ the main switch $Q_m$ may be opened if the resulting duty cycle provides the desired voltage across the LOAD.

Under low current $I_{out}$ conditions, the timing of opening and closing of the various switches of the circuit 40 may be such that a discontinuous mode in obtained, in which current stops completely in the output inductance if the opposite switch $Q_o$ is kept open during the freewheeling period. In fact, under this condition, the opposite switch $Q_o$ is not closed because the reverse current in its parasitic diode $D_{Qo}$ has a very low current variation di/dt, determined by a voltage on the LOAD divided by a value of the inductor $L_{out}$. Consequently, the parasitic diode $D_{Qo}$ has a low recovery current and generates few losses or stray EMI noise.

Figure 5:
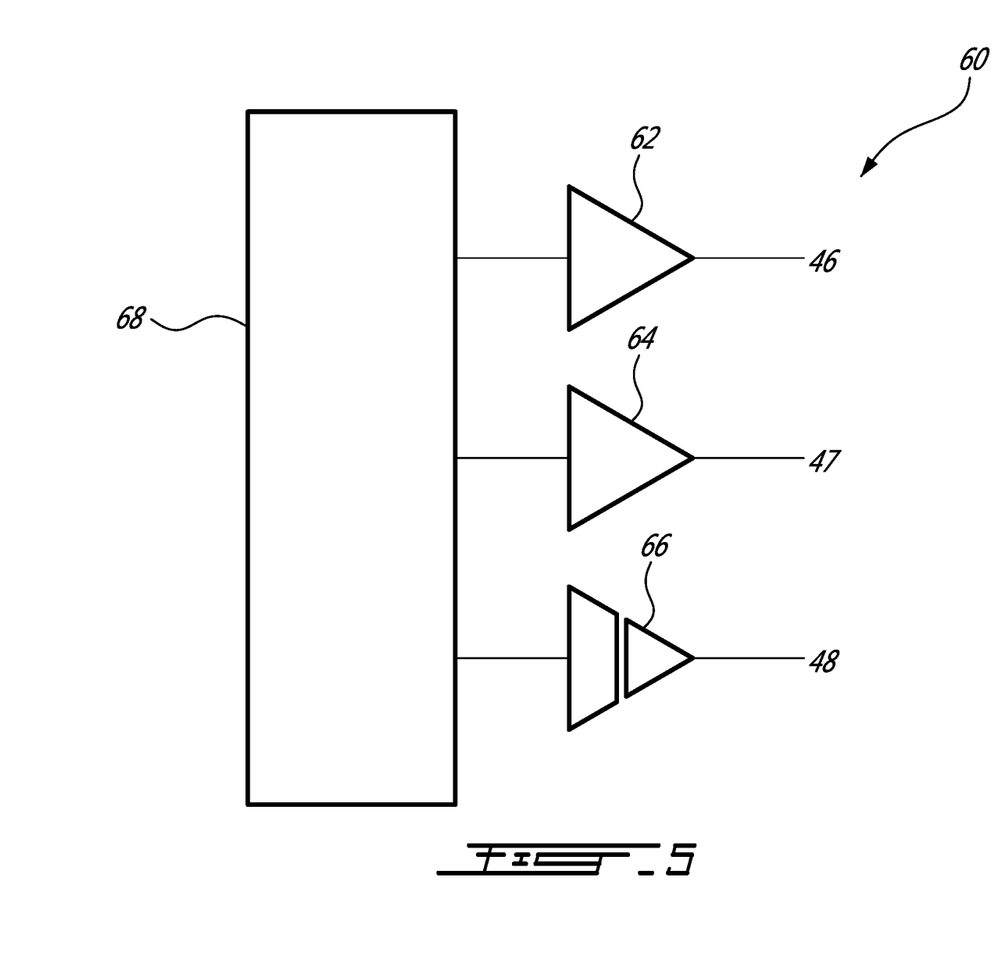
FIG. 5 is a schematic diagram of a gate driver circuit for controlling the switches of the circuit of FIG. 3.

FIG. 5 is a schematic diagram of a gate driver circuit for controlling the switches of the circuit of FIG. 3. In a gate driver circuit 60, three (3) gate drivers 62, 64 and 66 are each dedicated to distinct switches, being respectively connected to the gate 46 of the main switch $Q_m$, to the gate 47 of the auxiliary switch $Q_a$, and to the gate 48 of the opposite switch $Q_o$. A synchronizing controller 68 provides signals to the gate drivers 62, 64 and 66 to control opening and closing sequences of the switches. The synchronizing controller 68 sets a time $t_0$ for initiating a cycle of the circuit 40 and internally stores a value for the time $t_1$ as a constant. The synchronizing controller 68 implements real-time calculations of equations (1) and (2) to determine a value for the time $t_3$, when the opposite switch $Q_o$ opens. Value to the time $t_5$ when the main switch $Q_m$ is closed and of the time $t_6$ when the auxiliary switch $Q_a$ is open does not need to be calculated but may instead be assessed from tables based on the current $I_{out}$ and the input voltage $V_{in}$. The synchronizing controller 68 also controls the duty cycle of the circuit 40, effectively controlling the voltage applied to the LOAD.

The synchronizing controller 68 performs its calculations at a rapid rate, for example at a rate of 500 kHz, in order to update the timing according to the output current $I_{out}$. Furthermore, the controller should have the ability to respond with a sufficient resolution in the order of about 10 nsec which is on the order of about 0.5% of the full cycle. Without limitation, the synchronizing controller 68 may be implemented using one or more Field Programmable Gate Arrays (FPGA), Digital Signal Processors (DSP), Application Specific Integrated Circuits (ASIC), or any combination of such devices.

The opposite diode $D_o$ of the DC-DC converter introduced in the foregoing description of FIG. 2 needs to be replaced with a switch when implementing a full leg configuration having two (2) commutation cells forming for example a DC-AC converter. In fact, when MOSFET technology is used, the choice of opposite diodes is limited to the parasitic diode of the opposite MOSFET switch. These parasitic diodes are notoriously slow, which exacerbates the problems related to recovery current.

Figure 6:
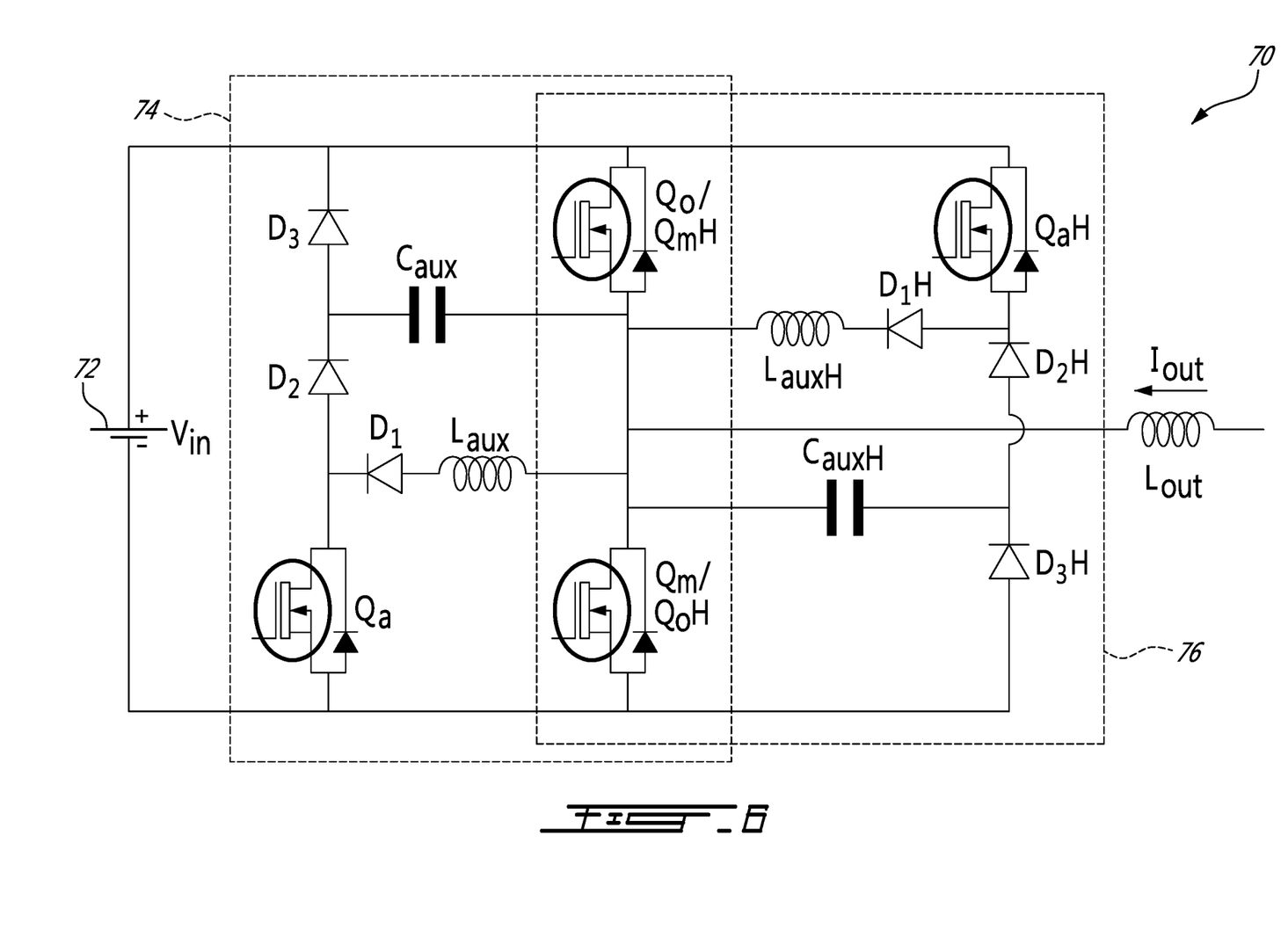
FIG. 6 is a circuit diagram of a soft switching synchronized DC-AC converter according to another embodiment.

The opposite switch $Q_o$ of the circuit 40 may be further used as a main switch for an added commutation cell. FIG. 6 is a circuit diagram of a soft switching synchronized DC-AC converter according to another embodiment. A circuit 70 includes a source 72 and combination 74 including a commutation cell and an auxiliary circuit, as described in the foregoing description of FIG. 3. The circuit 70 adds a further combination 76 including a peer commutation cell and auxiliary circuit, the combination 76 having a reverse polarity. The commutation cell of the combination 74 is, in the context of the circuit 70, a low' commutation cell while the peer commutation cell is a 'high' commutation cell. A peer auxiliary switch $Q_{aH}$ has, in the high commutation cell, the same function as the auxiliary switch $Q_a$ of the low commutation cell. Likewise, peer diodes $D_{1H}$, $D_{2H}$, $D_{3H}$, a peer auxiliary inductor $L_{1auxH}$ and a peer auxiliary capacity $C_{auxH}$ respectively play the same roles in the high commutation cell as the diodes $D_1$, $D_2$, $D_3$, the auxiliary inductor $L_{1aux}$ and the auxiliary capacity $C_{aux}$ of the low commutation cell.

The opposite switch $Q_o$ introduced in the foregoing description of FIG. 3 still has the same function in the low commutation cell and is further used as a peer main switch $Q_{mH}$ in the high commutation cell. Likewise, the main switch $Q_m$ of the low commutation cell is also used as a peer opposite switch $Q_{oH}$ for operation of the high commutation cell.

In one operating phase of the circuit 70, the current $I_{out}$ flows in the direction indicated by the arrow above the inductor $L_{out}$, through the main switch $Q_m$ of the low commutation cell and to the source 72. In another operating phase of the circuit 70, the current $I_{out}$ flows in the opposite direction, from the source 72 and through the peer main switch $Q_{mH}$. As a result, the current $I_{out}$ flowing through the LOAD is an alternative current in the circuit 70. Phase transitions for each of the commutation cells are handled in the same manner as described hereinabove. The gate driver circuit 60 of FIG. 5 may be extended with an additional gate driver (not shown) to also control the gate of the auxiliary switch $Q_{aH}$.

Those of ordinary skill in the art will realize that the description of the circuits for softening switching phases in voltage converters are illustrative only and are not intended to be in any way limiting. Other embodiments will readily suggest themselves to such persons with ordinary skill in the art having the benefit of the present disclosure. Furthermore, the disclosed circuits may be customized to offer valuable solutions to existing needs and problems related to poor efficiency and electromagnetic noise generation in power electronics circuits.

It should be observed that, in the case of other power electronic switch types, for example bipolar transistors, the term "gate" may be replaced with "base", the base being controlled by a current as opposed to the gate that is controlled by a voltage. These distinctions do not change the overall operation principles described hereinabove.

In the interest of clarity, not all of the routine features of the implementations of the circuits are shown and described. It will, of course, be appreciated that in the development of any such actual implementation of the circuits, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of power electronics having the benefit of the present disclosure.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A circuit for providing a current from a source to a load, the circuit comprising:
   a commutation cell including a main switch configured to control a voltage applied by the source to the load;
   an opposite switch provided with a parasitic diode and configured to maintain the current in the load when the load is disconnected from the source by the main switch and to return the load current to the main switch when the main switch connects again the load to the source;
   a synchronizing controller configured to control opening and closing sequences of the main switch and of the opposite switch;
   an auxiliary switch controlled by the synchronizing controller; and
   an auxiliary inductor connecting the main switch toward the auxiliary switch via a first diode, wherein the auxiliary inductor is configured to limit a variation of current flowing in the auxiliary switch at a time when, concurrently, the main switch is opened, the opposite switch is closed to maintain the current in the load, and closure of the auxiliary switch is initiated, and wherein the synchronizing controller is configured to open the opposite switch after the closing of the auxiliary switch, the synchronizing controller calculating a delay for opening the opposite switch after the current flowing in the auxiliary inductor exceeds an output current of the commutation cell.

2. The circuit of claim 1, wherein the synchronizing controller is configured to calculate the delay for opening the opposite switch so as to reduce switching losses in the parasitic diode of the opposite switch.

3. The circuit of claim 1, wherein the synchronizing controller is configured to close the main switch after the current flowing in the auxiliary inductor reaches a maximum and then to open the auxiliary switch.

4. The circuit of claim 1, comprising an auxiliary capacitor connected in parallel with the auxiliary inductor and the first diode, through a second diode.

5. The circuit of claim 4, wherein the auxiliary capacitor is connected in parallel with the opposite switch, through a third diode.

6. The circuit of claim 4, wherein the auxiliary capacitor is configured to receive charges from the auxiliary switch when the auxiliary switch opens and to transfer the charges to the main switch when the main switch opens.

7. The circuit of claim 1, wherein each of the main switch and the opposite switch is selected from a metal-oxide-semiconductor field-effect transistor (MOSFET), a silicon carbide junction field effect transistor (JFET), a gallium nitride JFET, and a combination of an insulated-gate bipolar transistor (IGBT) in parallel with an associated diode.

8. The circuit of claim 1, wherein the auxiliary switch is selected from a MOSFET, a silicon carbide JFET, a gallium nitride JFET, and a combination of an IGBT in parallel with an associated diode.

9. The circuit of claim 1, wherein the synchronizing controller provides control signals to each of the main switch and the opposite switch via respective gate drivers.

10. The circuit of claim 1, wherein the synchronizing controller provides control signals to the auxiliary switch via a dedicated gate driver.

11. The circuit of claim 1, wherein the synchronizing controller is selected from one or more field programmable gate arrays (FPGA), one or more complex programmable logic device (CPLD), one or more digital signal processors (DSP), one or more application specific integrated circuits (ASIC), or any combination thereof.

12. The circuit of claim 1, wherein the synchronizing controller is configured to open the opposite switch following a reversal of current flowing in the opposite switch.

13. Use of the circuit of claim 1 to convert a DC voltage of the source to another DC voltage applied to the load.

14. A DC to AC converter, comprising:
a circuit for providing a current from a source to a load, the circuit comprising:
   a first commutation cell including a main switch, which, during a first operating phase, is configured to control a voltage applied by the source to the load during the first operating phase;
   an opposite switch provided with a parasitic diode during the first operating phase, which is configured to maintain the current in the load when the load is disconnected from the source by the main switch and to return the load current to the main switch when the main switch connects again the load to the source during the first operating phase;
   a synchronizing controller configured to control opening and closing sequences of the main switch and of the opposite switch; and
   a peer commutation cell also comprising the main switch and the opposite switch, in which the opposite switch operates functionally as a peer main switch of the peer commutation cell during a second operating phase, and in which the main switch is used as a peer opposite switch of the peer commutation cell during the second operating phase;
wherein the synchronizing controller controls opening and closing sequences of the main switch, which is also used as the peer opposite switch, and of the opposite switch, which is also used as the peer main switch, so that the current flowing in the load is an alternating current.

* * * * *